US012626564B2

(12) United States Patent
Penacho et al.

(10) Patent No.: US 12,626,564 B2
(45) Date of Patent: May 12, 2026

(54) CONTROLLING VOLATILITY AND RETURN TO PLAYER IN EXPANDED HOLD-AND-SPIN FEATURES

(71) Applicant: Aristocrat Technologies, Inc., Las Vegas, NV (US)

(72) Inventors: Gary Penacho, Henderson, NV (US); Allon Englman, Las Vegas, NV (US)

(73) Assignee: Aristocrat Technologies, Inc., Las Vegas, NV (US)

(*) Notice: Subject to any disclaimer, the term of this patent is extended or adjusted under 35 U.S.C. 154(b) by 359 days.

(21) Appl. No.: 17/955,272

(22) Filed: Sep. 28, 2022

(65) Prior Publication Data

US 2024/0105013 A1 Mar. 28, 2024

(51) Int. Cl.
*G07F 17/32* (2006.01)

(52) U.S. Cl.
CPC ...... *G07F 17/3267* (2013.01); *G07F 17/3213* (2013.01); *G07F 17/3258* (2013.01); *G07F 17/3262* (2013.01)

(58) Field of Classification Search
CPC ............. G07F 17/3267; G07F 17/3213; G07F 17/3258; G07F 17/3262
See application file for complete search history.

(56) References Cited

U.S. PATENT DOCUMENTS

2003/0050111 A1* 3/2003 Saffari ................ G07F 17/3255 463/25
2005/0277457 A1* 12/2005 Wilson ................ G07F 17/3267 463/12
2007/0057464 A1* 3/2007 Cockrell, Jr. ............. A63F 1/00 273/303
2007/0099695 A1* 5/2007 Wilson .................... G07F 17/34 463/25
2008/0026831 A1* 1/2008 Wright ................ G07F 17/3281 463/26
2008/0242421 A1* 10/2008 Geisner ................... A63F 13/75 463/42
2009/0270163 A1* 10/2009 Mitelman ............... G07F 17/32 463/20
2012/0064961 A1* 3/2012 Vancura .............. G07F 17/3265 463/20
2016/0063799 A1* 3/2016 Reeves ................. G07F 17/326 463/17
2018/0130285 A1* 5/2018 Ang .................... G07F 17/3244
2021/0279999 A1* 9/2021 Meyer ................. G07F 17/3267
2021/0304566 A1* 9/2021 Penacho ............. G07F 17/3244

(Continued)

*Primary Examiner* — Jeffrey K Wong
(74) *Attorney, Agent, or Firm* — Blank Rome LLP

(57) ABSTRACT

A hold-and-spin feature is expanded and a potential game outcome is increased by triggering resetting of the remaining number of spins to different reset spin values based on the collection of a number of first respin triggering symbols. In order to control and manage the degree of randomness in having different numbers of reset spin values, and thus controlling game volatility and/or thus maintaining a target RTP, multiple reel strip types with different properties are used to select symbols for various positions in the symbol matrix. The multiple reel strip types may have different probabilities of selecting credit symbols, non-credit symbols, first respin triggering symbols, second triggering symbols, and so on.

18 Claims, 11 Drawing Sheets

500

501

(56) References Cited

U.S. PATENT DOCUMENTS

| | | | | |
|---|---|---|---|---|
| 2022/0139172 | A1* | 5/2022 | Uberuaga | G07F 17/3225<br>463/20 |
| 2023/0025925 | A1* | 1/2023 | Davis | G07F 17/34 |
| 2023/0094183 | A1* | 3/2023 | Jairath | G07F 17/3267<br>463/20 |

* cited by examiner

700

702 701 703

| SPECIAL | | | REGULAR | | COIN | |
|---|---|---|---|---|---|---|
| 1 | ace | | 9 | ace | 9 | ace |
| 1 | COR | | 1 | COR | 1 | COR |
| 1 | queen | | 9 | queen | 9 | queen |
| 1 | COR | | 1 | COR | 1 | COR |
| 1 | eagle | | 9 | eagle | 1 | COR |
| 1 | COR | | 1 | COR | 1 | coin |

704 705 706

FIG. 7

CONTROLLING VOLATILITY AND RETURN TO PLAYER IN EXPANDED HOLD-AND-SPIN FEATURES

BACKGROUND

Electronic gaming machines ("EGMs") or gaming devices provide a variety of wagering games such as slot games, video poker games, video blackjack games, roulette games, video bingo games, keno games, and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens, or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

SUMMARY

A game outcome may be determined for a hold-and-spin feature based on a number of credit symbols collected in a symbol matrix over a series of spins. The present disclosure expands the hold-and-spin feature and increases the potential for the game outcome by triggering resetting of the remaining number of spins to different reset spin values based on the collection of a number of first respin triggering symbols. Having different numbers of reset spin values (and/or different numbers of added spins) may increase the randomness in the hold-and-spin feature. The increased randomness in the hold-and-spin feature may affect game volatility, RTP, and so on. These problems may be exacerbated when additional features increase the potential for the game outcome, such as increasing the symbol matrix size, unlocking additional symbol matrix rows, and so on. The degree of randomness in having different numbers of reset spin values (and/or different numbers of added spins), and thus game volatility and/or RTP, are controlled by controlling which of multiple reel strip types (which have different probabilities of selecting credit symbols, non-credit symbols, first respin triggering symbols, second triggering symbols, and so on) are used to select symbols for how many positions in the symbol matrix, which positions in the symbol matrix which of the multiple reel strip types are used to select symbols for, and so on.

BRIEF DESCRIPTION OF THE DRAWINGS

FIG. 7 depicts examples of reel strip types that may be used with one or more hold-and-spin features discussed herein.

DETAILED DESCRIPTION

Figure 1:
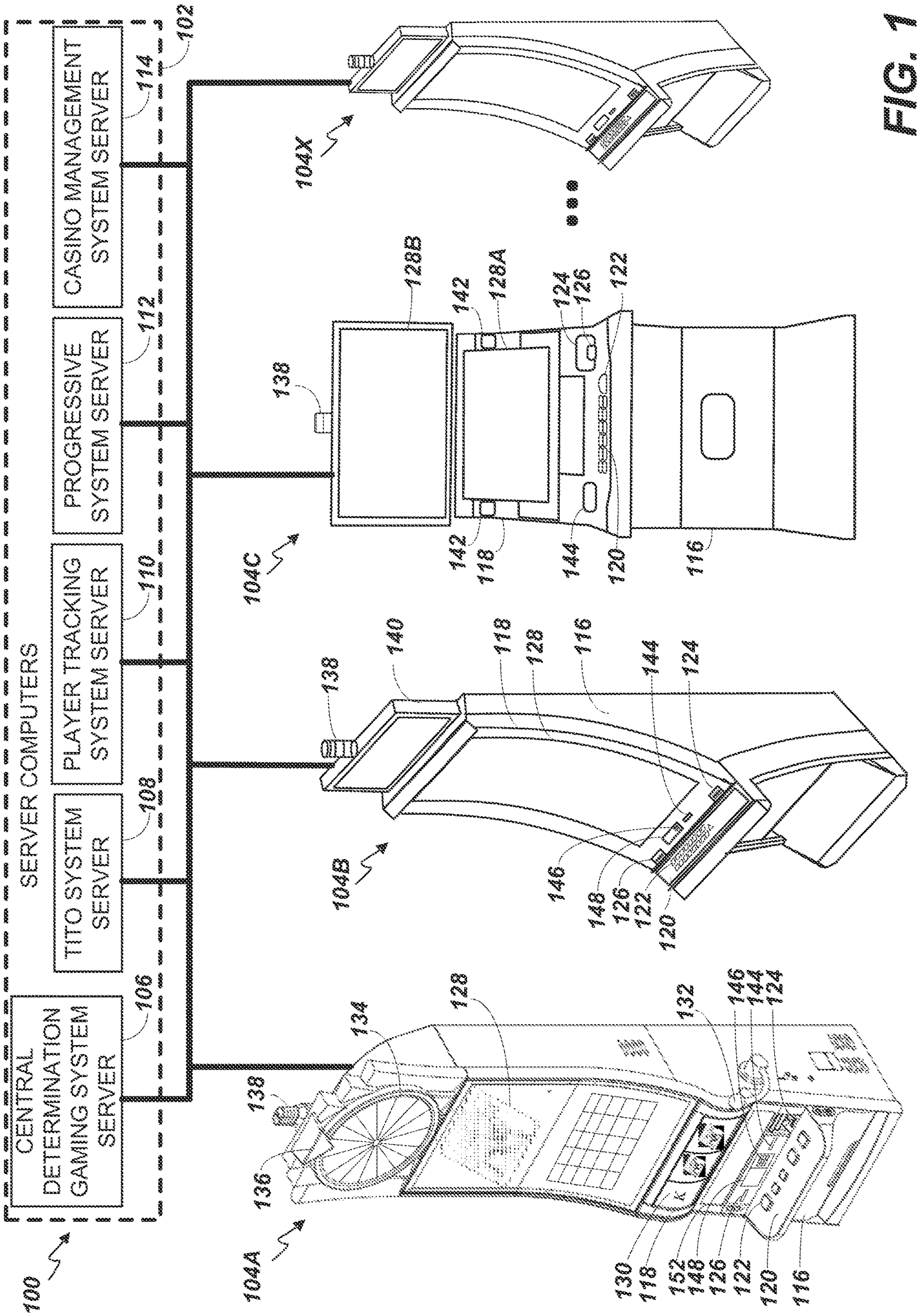
FIG. 1 is an exemplary diagram showing several EGMs networked with various gaming related servers.

Hold-and-spin features involve a player chasing a goal by collecting designated symbols, usually within a series of spins. The more collected designated symbols during the series of spins, the higher the game outcome. The player may collect the designated symbols in a symbol matrix to which symbols are assigned from one or more reel strips (such as based on one or more numbers produced by one or more random number generators or "RNGs") during each spin. Designated symbols may be retained or "held" in the symbol matrix between each spin such that only positions in the symbol matrix not occupied by held designated symbols may have symbols assigned from the one or more reel strips on subsequent spins.

For example, a hold-and-spin feature may involve credit symbols and non-credit symbols where the credit symbols are the designated symbols. The credit symbols may include a numeric credit value whereas the non-credit symbols may be any other symbols (such as one or more playing card symbols (such as one or more aces, kings, queens, jacks, tens, and so on), stars, faces, eagles, coins, blank symbols, and so on). Credit symbols from previous spins in the series of spins may be held in the symbol matrix whereas non-credit symbols may be removed after a spin to enable new symbols to be selected. At the end of the hold-and-spin feature, the game outcome may be determined from the credit symbols that have been collected during the series of spins, such as by summing numeric credit values associated with the collected credit symbols.

As discussed above, the hold-and-spin feature may involve a series of spins. This may involve an initial number of spins, such as 10, 6, and so on. In some implementations, the hold-and-spin feature may be expanded and the potential game outcome may be increased by triggering a reset of the number of spins remaining to a reset spin value (such as 3, 6, and so on) (presuming the number of spins remaining is below the reset spin value, otherwise the remaining number of spins may be left alone, may have one or more spins added to it, and so on), adding a number of spins (such as 2, 3, and so on) to the number of spins remaining, and so on. This may be triggered by collection of a number of credit symbols (such as 1, 3, and so on) during a spin. In this way, a credit symbol may be a “triggering symbol” as it may potentially trigger resetting spins and/or otherwise alter the number of spins remaining. This may increase the volatility of the hold-and-spin feature (i.e., variance between the highest and lowest game outcomes) and can affect return to player (RTP). As such, the odds of selecting a credit symbol during a spin may be controlled in order to control the volatility, maintain a target RTP, and so on. This may be done to conform to one or more rules, regulations, and/or laws.

The present disclosure may further expand the hold-and-spin feature and additionally increase the potential game outcome by using one or more different triggering symbols (such as 1, 3, and so on). Thus, the credit symbols may be a first respin triggering symbol and the different triggering symbols may be a second triggering symbol. Collection of such different triggering symbols during a spin may reset the number of spins remaining to a different reset spin value. However, such different triggering symbols may not directly influence the game outcome the way that the credit symbols do. As such, the different triggering symbols may be used to expand the hold-and-spin feature, increase the potential game outcome, add different numbers of spins to the number of spins remaining than the credit symbols, and/or reset the remaining spin count to different reset spin values of the credit symbols without directly having the different triggering symbols being directly counted when determining the game outcome.

However, having different numbers of reset spin values (and/or different numbers of added spins) may increase the randomness in the hold-and-spin feature. The increased randomness in the hold-and-spin feature may affect game volatility, RTP, and so on. These problems may be exacerbated when additional features increase the potential game outcome, such as increasing the symbol matrix size, unlocking additional symbol matrix rows, and so on. In order to control and manage the degree of randomness in having different numbers of reset spin values (and/or different numbers of added spins), and thus controlling game volatility and/or thus maintaining a target RTP, multiple reel strip types with different properties may be used to select symbols for various positions in the symbol matrix. The multiple reel strip types may have different probabilities of selecting credit symbols, non-credit symbols, different triggering symbols, and so on.

For example, the reel strip types may include a first reel strip type that includes credit symbols and non-credit symbols but no different triggering symbols, and a second reel strip type that includes the different triggering symbols. The degree of randomness in having different numbers of reset spin values (and/or different numbers of added spins) may thus be controlled by controlling which of the first reel strip type or the second reel strip type is used to select symbols for how many positions in the symbol matrix, which positions in the symbol matrix which of the first reel strip type or the second reel strip type is used to select symbols for, and so on.

In another example, the reel strip types may include a regular reel strip type, an enhanced reel strip type, and a different triggering symbol reel strip type. The regular reel strip type may have a certain probability of selecting a credit symbol and a certain probability of selecting a non-credit symbol but may not include different triggering symbols. The enhanced reel strip type may have an increased probability of selecting a credit symbol as opposed to selecting a non-credit symbol. The different triggering symbol reel strip type may include the probability of selecting a different triggering symbol. The different triggering symbol reel strip type may include the same and/or similar probability of otherwise selecting a credit symbol and/or a non-credit symbol as the regular reel strip type and/or the enhanced reel strip type. The degree of randomness in having different numbers of reset spin values (and/or different numbers of added spins) may thus be controlled by controlling which of the three reel strip types is used to select symbols for how many positions in the symbol matrix, which positions in the symbol matrix each of the three reel strips is used to select symbols for, and so on.

Additionally, the chase for a player during a hold-and-spin game may be improved by having more credit symbols being selected during earlier spins. The rate of credit symbols selection may be reduced in later spins without significantly impacting the improved chase by the player. However, altering the probability of selection of credit symbols during the hold-and-spin game based on the number of credit symbols that have been selected during previous spins, the rate at which credit symbols were selected in previous spins, and so on is a secondary consideration. Such secondary considerations may be prohibited by one or more rules, regulations, and/or laws. Controlling which of the three reel strips is used to select symbols for how many positions in the symbol matrix, which positions in the symbol matrix which of the three reel strips is used to select symbols for, and so on may also be used to increase the odds that more credit symbols will be selected during earlier spins and decrease the odds that credit symbols will be selected in subsequent spins in a manner that is consistent throughout the series of spins and avoids secondary considerations to achieve this result. These and additional features are discussed in detail below.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
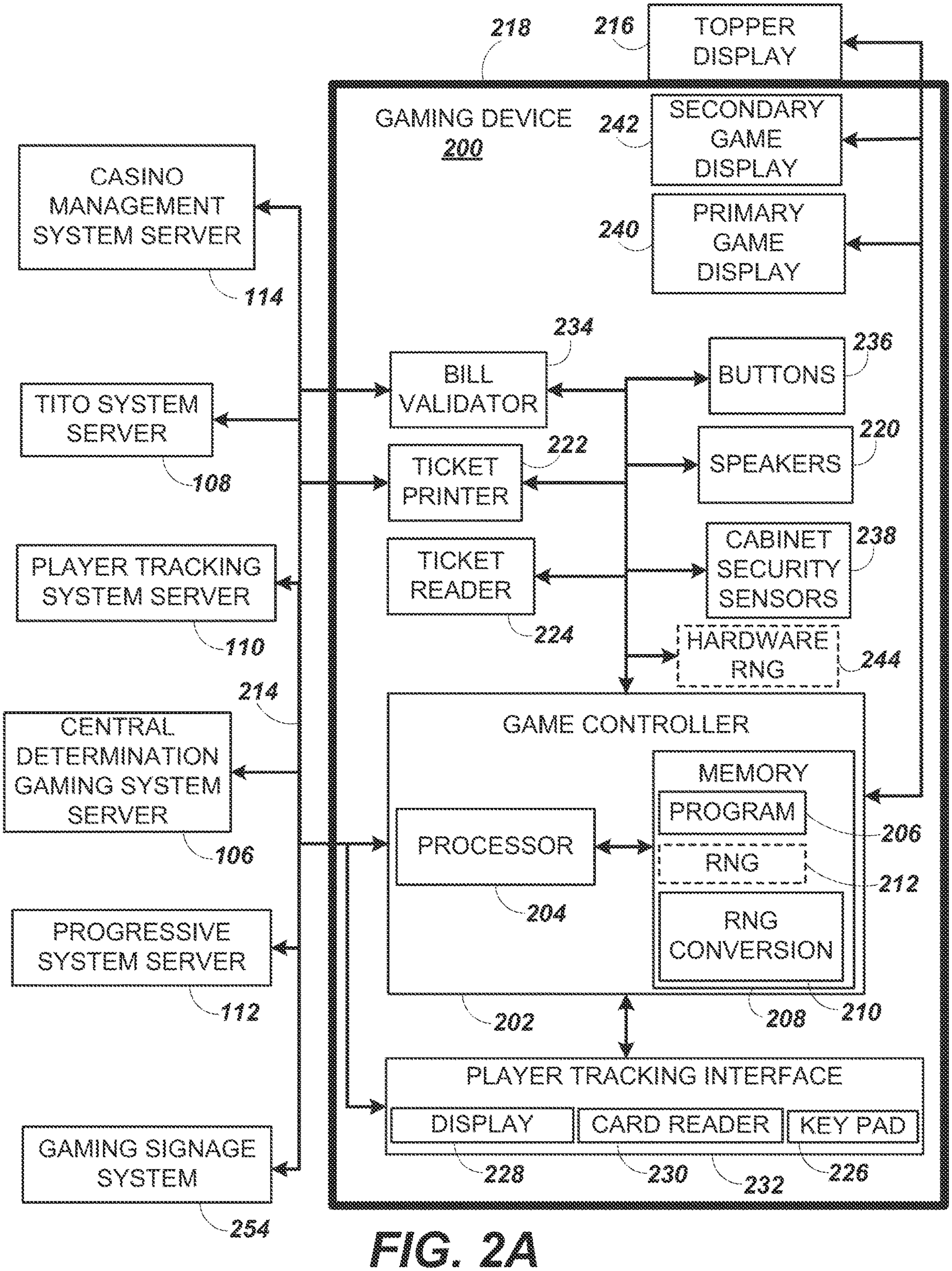
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a RNG that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
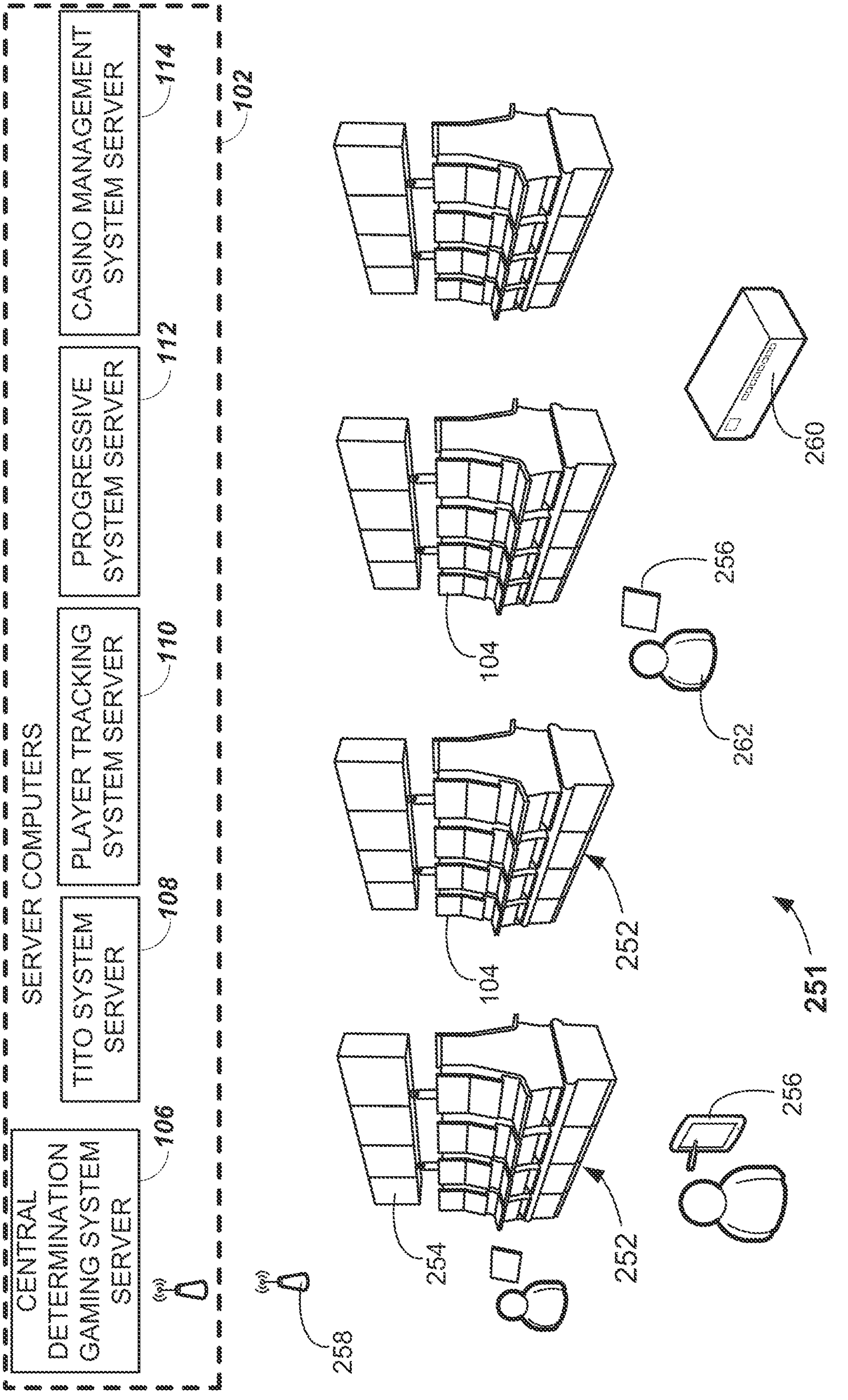
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
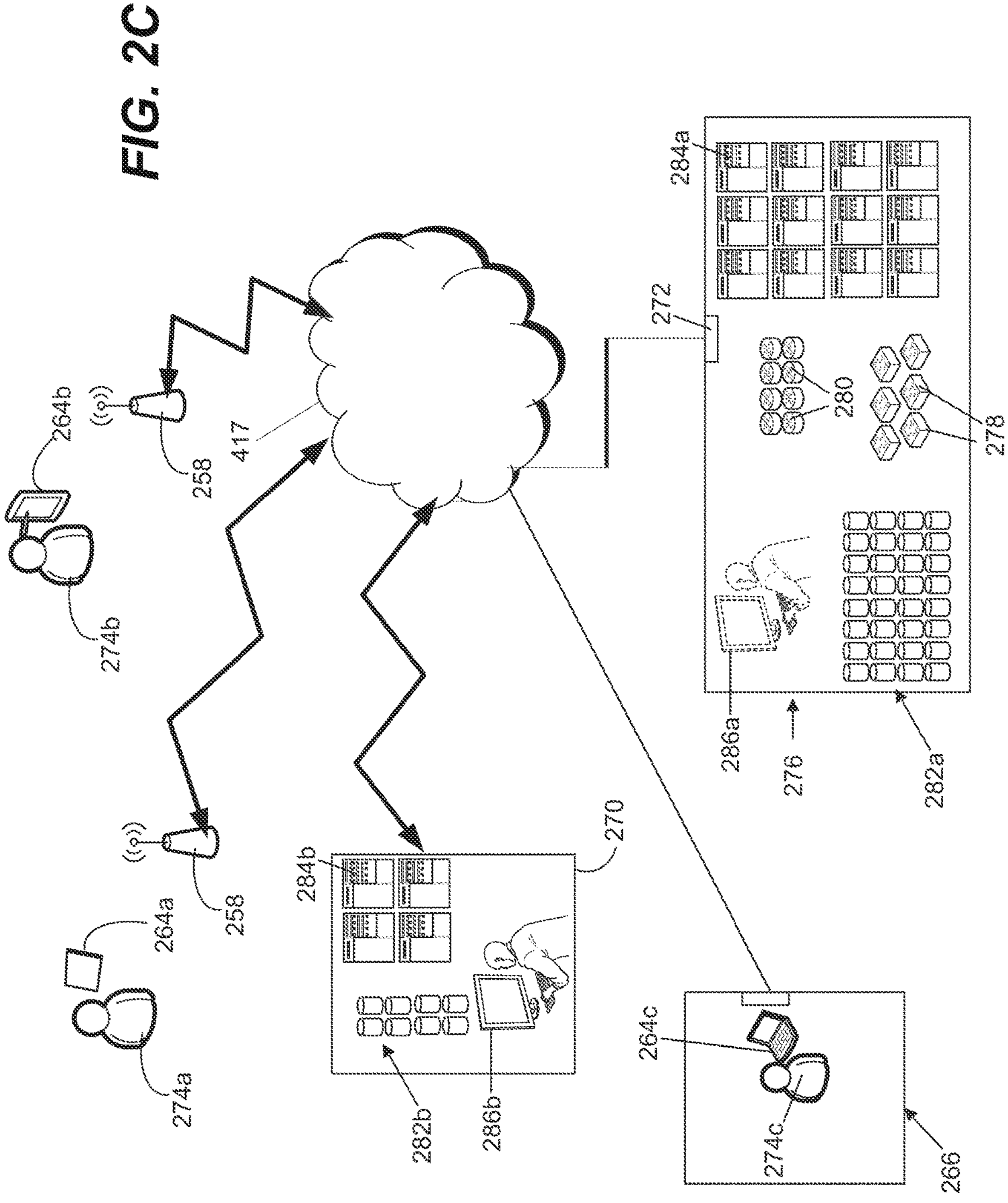
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server (s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
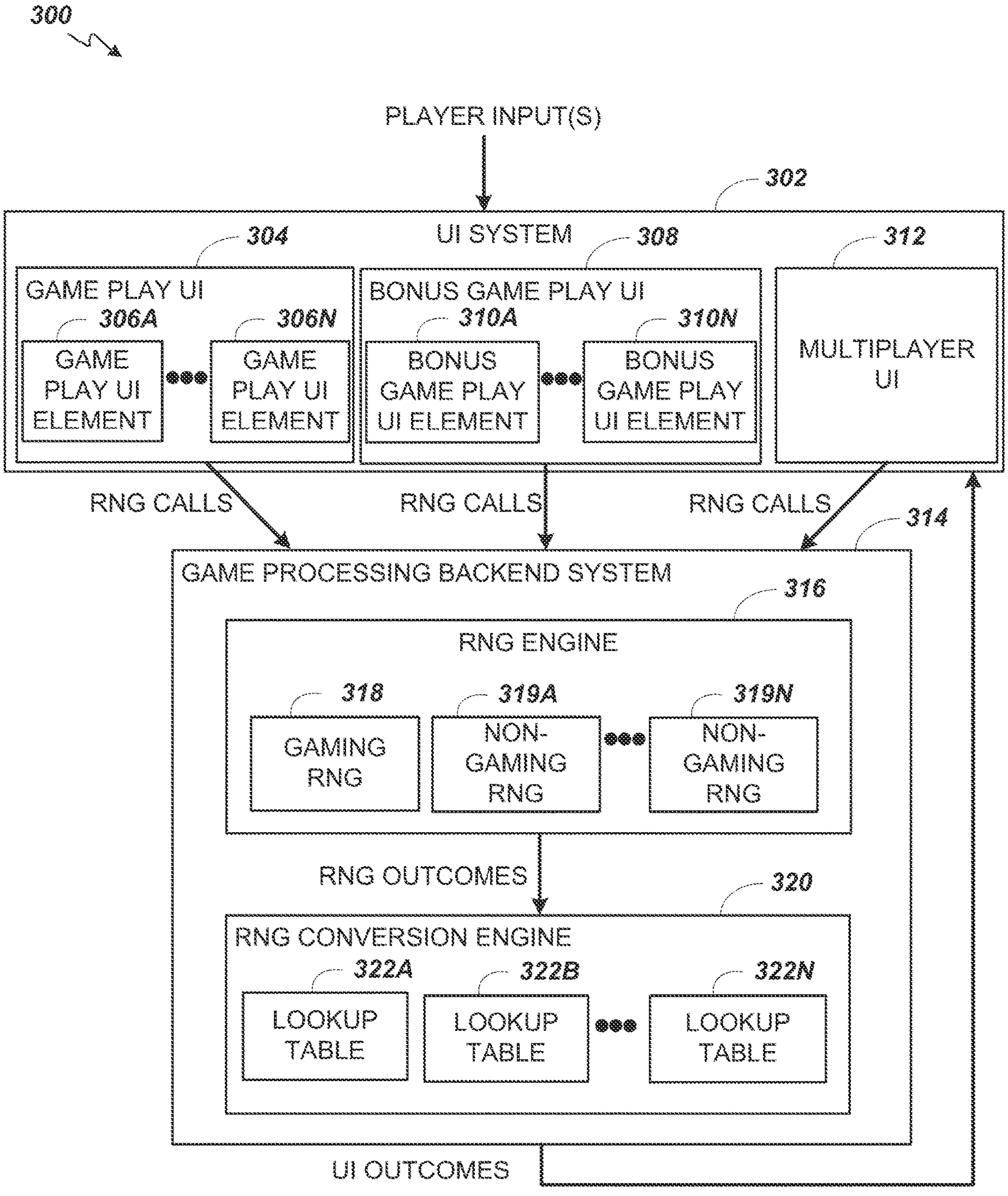
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4:
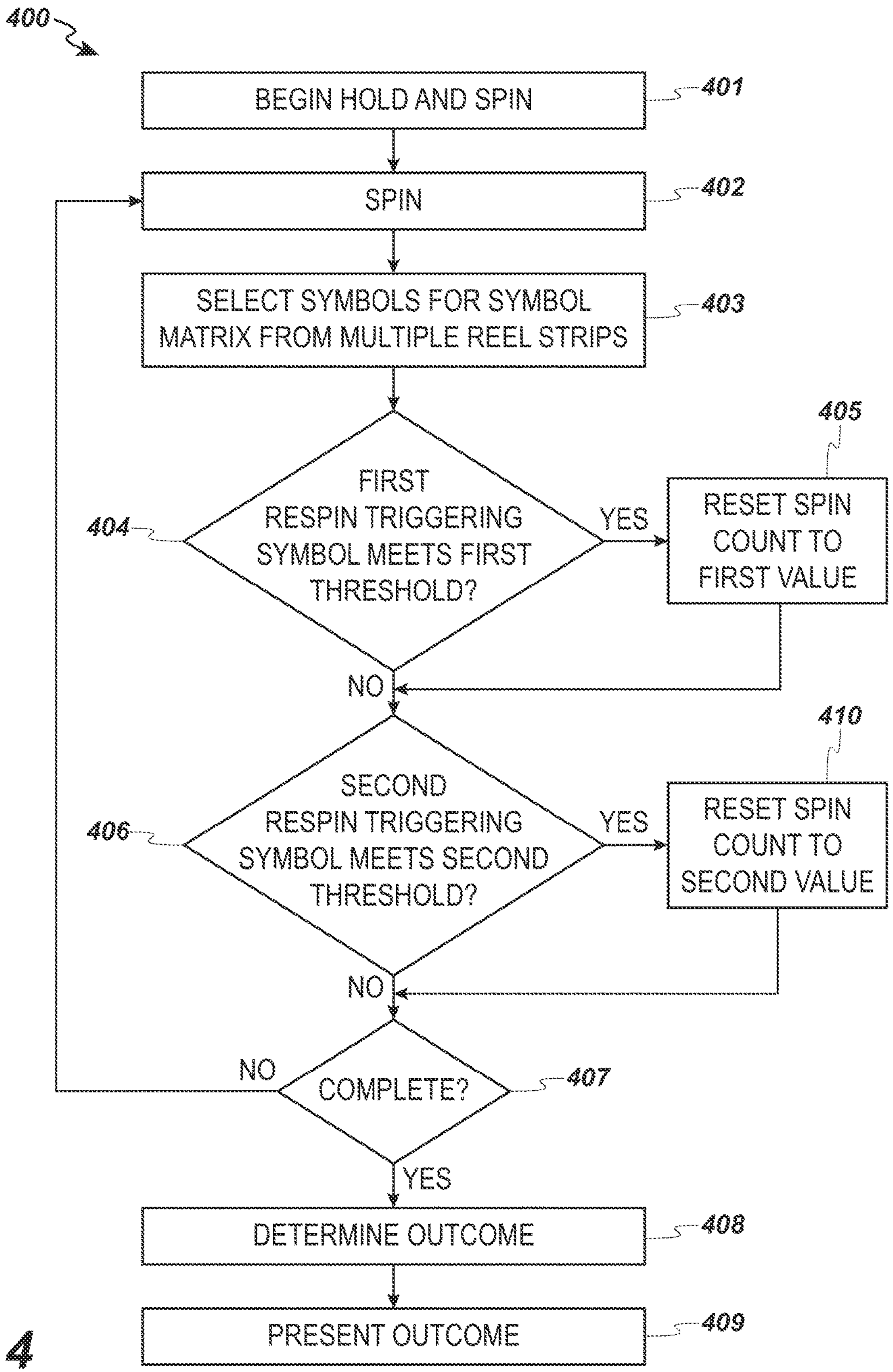
FIG. 4 depicts a first method for controlling volatility and return to player in an expanded hold-and-spin feature. The method may be performed by one or more of the devices depicted in FIGS. 1-3.

FIG. 4 depicts a first method 400 for controlling volatility and return to player in an expanded hold-and-spin feature. The method 400 may be performed by one or more of the devices depicted in FIGS. 1-3.

At operation 401, an electronic device (such as one or more of the devices depicted in FIGS. 1-3) may begin a hold-and-spin feature. The hold-and-spin feature may involve a player chasing a goal by collecting designated symbols within a series of spins. The more collected designated symbols during the series of spins, the higher the game outcome may be. The player may collect the designated symbols in a symbol matrix during each spin. Designated symbols may be held in the symbol matrix between each spin such that only positions in the symbol matrix not occupied by held designated symbols may have symbols assigned from the one or more reel strips on subsequent spins.

The number of spins remaining may be reset and/or added to by one or more mechanisms during the series of spins. The hold-and-spin feature may be expanded and the potential game outcome may be increased by triggering a reset of the number of spins remaining to a reset spin value (such as 3, 6, and so on) (presuming the number of spins remaining is below the reset spin value, otherwise the remaining number of spins may be left alone, may have one or more spins added to it, and so on), adding a number of spins (such as 2, 3, and so on) to the number of spins remaining, and so on. This may be triggered by collection of one or more numbers (such as 1, 3, and so on) of one or more types of triggering symbols during a spin. By way of illustration, credit symbols may be a first respin triggering symbol that resets the remaining spin count to 3 while coins or other symbols that are either non-credit symbols or both not credit symbols or non-credit symbols may be a second, different (different from the first respin triggering symbol of the credit symbol) respin triggering symbol that resets the remaining spin count to 6 when at least two land during a spin. This may increase the volatility of the hold-and-spin feature (i.e., variance between the highest and lowest game outcomes) and can affect RTP. As such, the odds of selecting a credit symbol during a spin may be controlled in order to control the volatility, maintain a target RTP, and so on. This may be done to conform to one or more rules, regulations, and/or laws.

In some examples, the hold-and-spin feature may involve credit symbols and non-credit symbols where the credit symbols are the designated symbols. The credit symbols may include a numeric credit value whereas the non-credit symbols may be any other symbols (such as one or more playing card symbols (such as one or more aces, kings, queens, jacks, tens, and so on), stars, faces, eagles, coins, blank symbols and so on). Credit symbols from previous spins in the series of spins may be held in the symbol matrix whereas non-credit symbols may be removed after a spin to enable new symbols to be selected. At the end of the hold-and-spin feature, the game outcome may be determined from the credit symbols that have been collected during the series of spins, such as by numeric credit values associated with the collected credit symbols. The hold-and-spin feature may be a base game, a bonus and/or other game triggerable from a base game, and so on. The hold-and-spin feature may be playable via the UI system 302 of FIG. 3.

At operation 402, the electronic device may initiate a spin of the hold-and-spin feature. The electronic device may initiate the spin of the hold-and-spin feature in response to user input from a player received via the UI system 302 of FIG. 3.

At operation 403, the electronic device may select symbols for a symbol matrix involved in the hold-and-spin feature from multiple reel strips. The electronic device may select symbols for the symbol matrix from one or more of the multiple reel strips using one or more numbers produced by an RNG.

For example, the reel strip types may include a first reel strip type that includes credit symbols and non-credit symbols but no different triggering symbols and a second reel strip type that includes the different triggering symbols. The degree of randomness in having different numbers of reset spin values (and/or different numbers of added spins) may thus be controlled by controlling which of the first reel strip type or the second reel strip type is used to select symbols for how many positions in the symbol matrix, which positions in the symbol matrix which of the first reel strip type or the second reel strip type is used to select symbols for, and so on.

In another example, the reel strip types may include a regular reel strip type, an enhanced reel strip type, and a different triggering symbol reel strip type. The regular reel strip type may have a certain probability of selecting a credit symbol and a certain probability of selecting a non-credit symbol but may not include different triggering symbols. The enhanced reel strip type may have an increased probability of selecting a credit symbol as opposed to selecting a non-credit symbol. The different triggering symbol reel strip type may include the probability of selecting a different triggering symbol. The different triggering symbol reel strip type may include the same and/or similar probability of otherwise selecting a credit symbol and/or a non-credit symbol as the regular reel strip and/or the enhanced reel strip. The degree of randomness in having different numbers of reset spin values (and/or different numbers of added spins) may thus be controlled by controlling which of the three reel strip types is used to select symbols for how many positions in the symbol matrix, which positions in the symbol matrix which of the three reel strips is used to select symbols for, and so on.

At operation 404, the electronic device may determine whether a first respin triggering symbol selected for the symbol matrix meets a first threshold. If so, the flow may proceed to operation 405 where the electronic device may reset the remaining spin count to a first value before the flow proceeds to operation 406. For example, the first respin triggering symbol may be a credit symbol, the threshold may be one, and the first value may be three. Otherwise, the flow may proceed directly to operation 406.

At operation 406, the electronic device may determine whether a second respin triggering symbol selected for the symbol matrix meets a second threshold. If so, the flow may proceed to operation 410 where the electronic device may reset the remaining spin count to a second value before the flow proceeds to operation 407. For example, the first respin triggering symbol may be a credit symbol, the threshold may be two, and the second value may be six. Otherwise, the flow may proceed directly to operation 407.

At operation 407, the electronic device may determine whether or not the hold-and-spin feature is complete. The electronic device may determine that the hold-and-spin feature is complete if the remaining spin count is zero. If not, the flow may return to operation 402 where the electronic device may again initiate a spin of the hold-and-spin feature. Otherwise, the flow may proceed to operation 408.

At operation 408, the electronic device may determine an outcome of the hold-and-spin feature. For example, the electronic device may determine the game outcome of the hold-and-spin feature based on the number of credit symbols in the symbol matrix. By way of illustration, the electronic device may determine the game outcome of the hold-and-spin feature by summing numeric credit values (such as 500, 2000, and so on) associated with credit symbols in the symbol matrix.

At operation 409, the electronic device may present the game outcome of the hold-and-spin feature. The electronic device may present the game outcome via a user interface, such as via the UI system 302 of FIG. 3.

In various examples, this example method 400 may be implemented as a group of interrelated software modules or components that perform various functions discussed herein. These software modules or components may be executed within a cloud network and/or by one or more computing devices, such as one or more of the devices depicted in FIGS. 1-3.

Although the example method 400 is illustrated and described as including particular operations performed in a particular order, it is understood that this is an example. In various implementations, various orders of the same, similar, and/or different operations may be performed without departing from the scope of the present disclosure.

For example, the method 400 is illustrated and described as determining whether or not two different triggering symbols trigger resetting the remaining number of spins. However, it is understood that this is an example. In various implementations, other numbers of different types of triggering symbols may be used, such as three, ten, and so on. Various configurations are possible and contemplated without departing from the scope of the present disclosure.

Further, although the method 400 is illustrated and described as resetting the number of spins remaining to a respin value or adding to the number of spins remaining, it is understood that this is an example. In some implementations, the method 400 may further include "adding" a spin value to the respin value to which the number of spins remaining is reset when one or more reset event occurs such that the respin value is larger than it previously was (i.e., it was previously three, but is increased to four, five, and so on).

Figure 8:
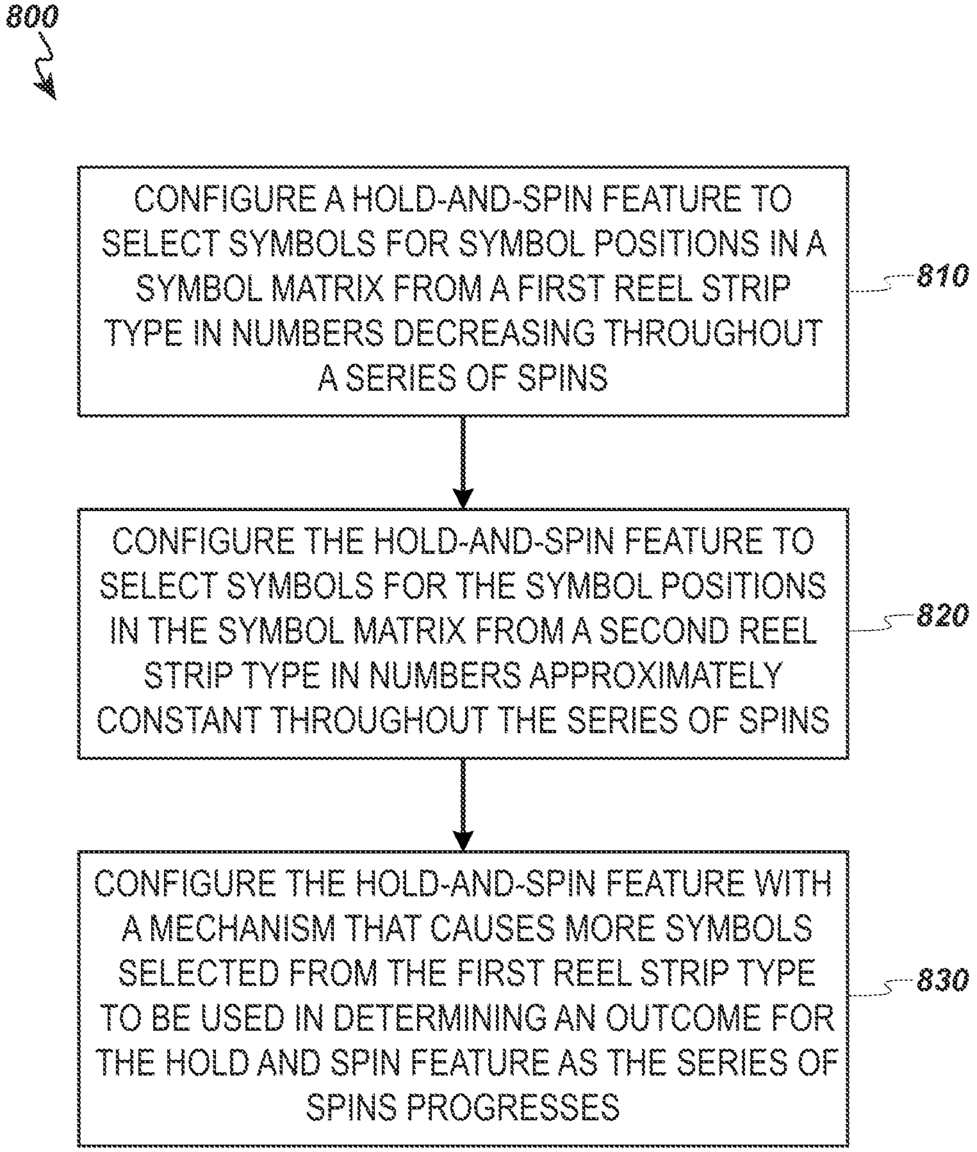
FIG. 8 depicts a second method for controlling volatility and return to player in an expanded hold-and-spin feature. The method may be performed by one or more of the devices depicted in FIGS. 1-3.

FIG. 8 depicts a second method 800 for controlling volatility and return to player in an expanded hold-and-spin feature. The method 800 may be performed by one or more of the devices depicted in FIGS. 1-3. The method 800 may be used to control randomness in the hold-and-spin feature throughout a series of spins.

At operation 810, an electronic device (such as one or more of the devices depicted in FIGS. 1-3) may configure a hold-and-spin feature to select symbols for symbol positions in a symbol matrix from a first reel strip type in numbers decreasing throughout a series of spins. This may increase the odds that more symbols from the first reel strip type will be selected during earlier spins and decrease the odds that symbols from the first reel strip type will be selected in subsequent spins in a manner that is consistent throughout the series of spins and avoids secondary considerations to achieve this result.

By way of illustration, the first reel strip type may include credit symbols (and/or other symbols) that may be a triggering symbol to potentially trigger a reset of remaining spins as well as may be used in determining a game outcome of the hold-and-spin feature. The above may increase the odds that more credit symbols will be selected during earlier spins and decrease the odds that credit symbols will be selected in subsequent spins in a manner that is consistent throughout the series of spins and avoids secondary considerations to achieve this result. This may increase the chase for a player during earlier spins without adversely affecting RTP by allowing too many credit symbols to land in later spins, increasing the game outcome, while still avoiding secondary considerations to achieve this result. Thus, the above may be used to control randomness in the hold-and-spin feature throughout a series of spins.

For example, the electronic device may configure the hold-and-spin feature to select symbols for fixed symbol positions in the symbol matrix from the first reel strip type and credit symbols (and/or other symbols) may be held in the symbol matrix from previous spins. As such, during later spins there may be fewer and fewer of the fixed symbol positions from which symbols may be selected from the first reel strip type.

At operation 820, the electronic device may configure the hold-and-spin feature to select symbols for the symbol positions in the symbol matrix from a second reel strip type in numbers approximately constant throughout the series of spins. The second reel strip type may include coin symbols (and/or other symbols) that may be a different triggering symbol to potentially trigger a reset of remaining spins but may not be used in determining a game outcome of the hold-and-spin feature. By selecting from a second reel strip type including a different triggering symbol that may potentially trigger a reset of remaining spins without directly affecting the game outcome in a way that is approximately constant throughout the spins, randomness in the hold-and-spin feature throughout a series of spins may be controlled while holding player interest by allowing the possibility of resetting of remaining spins to remain approximately constant.

For example, the electronic device may select a new set of symbol positions from the second reel strip type on every spin (such as using an RNG). The number may be a fixed number (such as three, five, and so on) on every spin (unless the number of available positions due to held symbols decreases to less than the number of the set of symbols positions to be selected), or may vary in a way that maintains an average over the series of spins (unless the number of available positions due to held symbols decreases to less than the number of the set of symbols to be selected), such as by selecting a number for a spin using an RNG and a weighted table that maintains the average number over the series of spins). Thus, "approximately constant" may be either fixed through the series of spins or varying but averaging a number over the series of spins.

At operation 830, the electronic device may configure the hold-and-spin feature with a mechanism that causes more symbols selected from the first reel strip type to be used in determining an outcome for the hold and spin feature as the series of spins progresses. For example, symbols selected from the first reel strip type may include credit symbols (and/or other symbols) that may be used to determine the game outcome. The electronic device may configure the hold-and-spin feature with a number of locked and unlocked rows and may only use the credit symbols that are on unlocked rows, though the credit symbols that are on locked rows may be used to determine whether to unlock additional rows and/or for other purposes, such as potentially triggering a reset of remaining spins. Further, the positions in the symbol matrix from which symbols from the first reel strip type may be selected may be interspersed across the locked rows. As such, more of the positions for which credit symbols may be selected may be unlocked as the series of spins progresses.

However, it is understood that this is an example. In various implementations, other RTP enhancing game mechanics may be combined with a varying respin spin value mechanic without departing from the scope of the present disclosure. Such RTP enhancing game mechanics include using increased multipliers, adding rows instead of unlocking locked rows, growing the symbol matrix size (e.g., adding one or more symbol positions above a column of the symbol matrix instead of adding an entire row), and so on.

In various examples, this example method 800 may be implemented as a group of interrelated software modules or components that perform various functions discussed herein. These software modules or components may be executed within a cloud network and/or by one or more computing devices, such as one or more of the devices depicted in FIGS. 1-3.

Although the example method 800 is illustrated and described as including particular operations performed in a particular order, it is understood that this is an example. In various implementations, various orders of the same, similar, and/or different operations may be performed without departing from the scope of the present disclosure.

For example, the method 800 is illustrated and described as performing multiple operations for configuring the hold-and-spin feature. In various implementations, the method 800 may include one or more additional operations, such as presenting the configured hold-and-spin feature, such as via the UI system 302 of FIG. 3. Various configurations are possible and contemplated without departing from the scope of the present disclosure.

Figure 5:
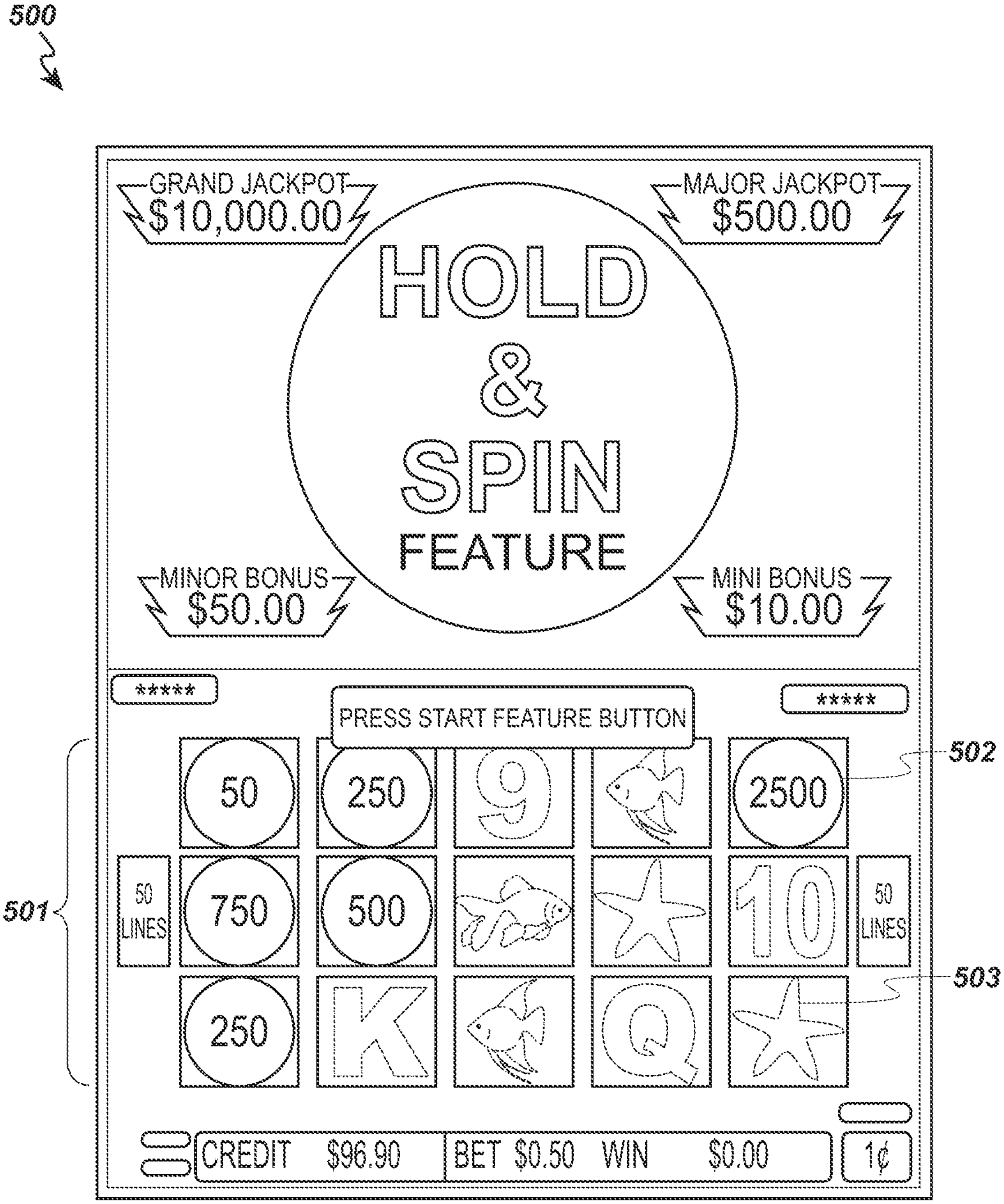
FIG. 5 depicts an example screen of an example hold-and-spin feature.

FIG. 5 depicts an example screen 500 of an example hold-and-spin feature. The hold-and-spin feature may include a symbol matrix 501. The symbol matrix 501 is shown as having 3×5 positions. However, it is understood that this is an example and that different numbers of positions may be used without departing from the scope of the present disclosure.

The hold-and-spin feature may involve credit symbols 502 and non-credit symbols 503. The credit symbols 502 may be the designated symbols discussed above that may be used to determine the game outcome of the hold-and-spin feature. The credit symbols 502 may include a numeric credit value whereas the non-credit symbols 503 may be any other symbols (such as one or more playing card symbols (such as one or more aces, kings, queens, jacks, tens, and so on), stars, faces, eagles, coins, blank symbols, and so on). Credit symbols 502 from previous spins in a series of spins involved in the hold-and-spin feature may be held in the symbol matrix whereas non-credit symbols 503 may be removed after a spin to enable new symbols to be selected. At the end of the hold-and-spin feature, the game outcome may be determined from the credit symbols that have been collected during the series of spins, such as by summing numeric credit values associated with the collected credit symbols.

Figure 6A:
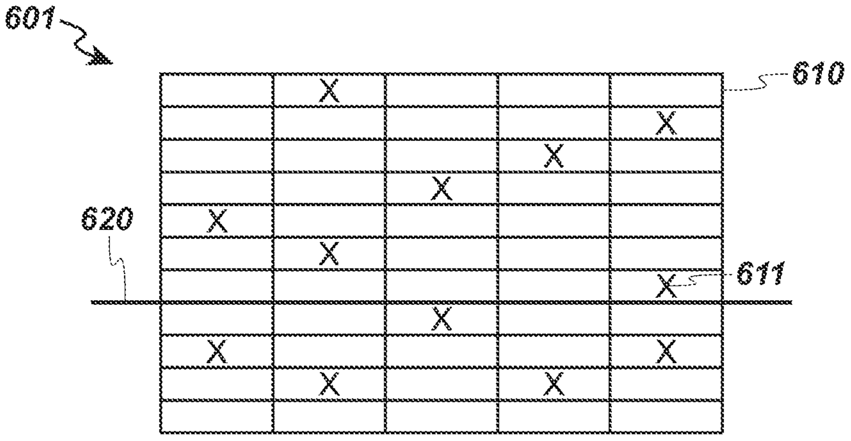
FIG. 6A depicts an example symbol matrix that may be used in a hold- and spin feature.

FIG. 6A depicts an example symbol matrix 601 that may be used in a hold-and spin feature. As shown, the example symbol matrix 601 may be a 5×11 matrix that defines 55 positions. However, it is understood that this is an example and that different numbers of positions may be used without departing from the scope of the present disclosure.

The example symbol matrix 601 includes a number of locked rows and a number of unlocked rows. The example symbol matrix 601 includes an indicator 620 that designates which of the rows are locked and which are unlocked. In this example, rows below the indicator 620 are unlocked while rows above the indicator 620 are locked. However, it is understood that this is an example. In other implementations, other indicators may be used. For example, locked rows may be shaded red. Presenting both locked and unlocked rows to a player may increase the chase as the player may be able to see what the game outcome might be if additional rows are unlocked. In still other examples, locked rows may be hidden from a player's view. Various configurations are possible and contemplated without departing from the scope of the present disclosure.

In this example, only credit symbols in unlocked rows may be used to determine the game outcome. Credit symbols in locked rows may not be used to determine the game outcome. However, credit symbols in locked rows may be used for other purposes. For example, locked rows may be unlocked based on a total number of credit symbols meeting an unlock threshold, such as where three additional credit symbols will unlock the next locked row. Various configurations are possible and contemplated without departing from the scope of the present disclosure.

Symbols may be selected for the example symbol matrix 601 during a spin of the hold-and-spin feature from one or more multiple reel strip types. In this, the reel strip types may include a regular reel strip and an enhanced reel strip. However, it is understood that this is an example. In other implementations, other numbers of reel strip types (such as three, five, and so on) and/or other reel strip types may be used without departing from the scope of the present disclosure. Various configurations are possible and contemplated without departing from the scope of the present disclosure.

The regular reel strip may have a certain probability of selecting a credit symbol and a certain probability of selecting a non-credit symbol. The enhanced reel strip may have an increased probability of selecting a credit symbol as opposed to selecting a non-credit symbol. The game outcome (and thus volatility and RTP) may be controlled by controlling which of the two reel strips is used to select symbols for how many positions in the example symbol matrix 601, which positions in the example symbol matrix 601 which of the two reel strips is used to select symbols for, and so on. Various configurations are possible and contemplated without departing from the scope of the present disclosure.

For example, the example symbol matrix 601 includes first symbol positions 610 (shown as blank) and second symbols positions 611 (shown with an "X"). Symbols may be selected for the first symbol positions 610 from the regular reel strip type and/or another reel strip type than the enhanced reel strip type while symbols for the second symbol positions 611 may be selected from the enhanced reel strip type. As such, symbols selected for the first symbol positions 610 may have less of a chance of being credit symbols than the symbols selected for the second symbol positions 611. Various configurations are possible and contemplated without departing from the scope of the present disclosure.

The first symbol positions 610 and the second symbol positions 611 may not change between spins of the hold- and spin feature. As such, the number of symbols selected from the enhanced reel strip type may be higher in earlier spins when more second symbol positions 611 are available and lower in later spins when more held symbols occupy the second symbol positions 611, reducing possible selections from the enhanced reel strip type. This may increase the odds that more credit symbols will be selected during earlier spins and decrease the odds that credit symbols will be selected in subsequent spins in a manner that is consistent throughout the series of spins and avoids secondary considerations to achieve this result. Various configurations are possible and contemplated without departing from the scope of the present disclosure.

Further, as shown, the second symbol positions 611 are interspersed across the locked rows. Specifically in this example, each locked row includes only one of the second symbol positions 611. This enables the locked rows to potentially include more credit symbols to potentially trigger reset of remaining spins and/or unlock rows while minimizing the chances that all such credit symbols will be used to determine the game outcome as each row will have to be unlocked before the credit symbol that could end up held in the respective second symbol position 611 would be used to determine the game outcome. This balances the use of the enhanced reel strip type to increase the chances of triggering reset of remaining spins and/or unlocking rows with keeping use of the enhanced reel strip type from too greatly increasing the game outcome. Various configurations are possible and contemplated without departing from the scope of the present disclosure.

In addition to the regular reel strip type and the enhanced reel strip type, the reel strip types may include a different triggering symbol reel strip type. Credit symbols (such as one) may trigger resetting the remaining spin count to a first value, such as three, whereas a different triggering symbol (such as a coin) may trigger resetting the remaining spin count to a second value, such as six. The regular reel strip and the enhanced reel strip may not include the different triggering symbol. The different triggering symbol reel strip type may include the probability of selecting a different triggering symbol. The different triggering symbol reel strip type may include the same and/or similar probability of otherwise selecting a credit symbol and/or a non-credit symbol as the regular reel strip and/or the enhanced reel strip. Various configurations are possible and contemplated without departing from the scope of the present disclosure.

Although FIG. 6A shows twelve second symbol positions 611, it is understood that this is an example. Other numbers may be used without departing from the scope of the present disclosure.

Figure 6B:
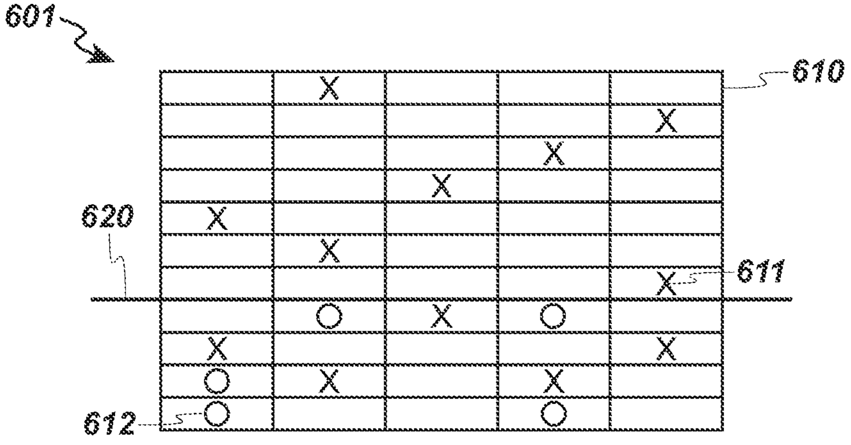
FIG. 6B depicts positions in the example symbol matrix that may be designated for selection of symbols from a different triggering symbol reel strip type.

FIG. 6B depicts positions in the example symbol matrix 601 that may be designated for selection of symbols from a different triggering symbol reel strip type. These positions may be third symbol positions 612 (shown with an "O"). Contrasted with the second symbol positions 611, the third symbol positions 612 may change between spins (see FIGS. 6C and 6D). For example, the positions of the third symbol positions 612 may be selected using an RNG. This may allow the odds of selecting the different triggering symbols to be approximately constant (unless the number of available positions due to held symbols decreases to less than the number of third symbol positions 612 to be selected) throughout the series of spins (i.e., the odds do not change from spin to spin) while the odds of selecting symbols from the enhanced reel strip decrease throughout the series of spins as the number of available second symbol positions 611 decreases as symbols are held in the second symbol positions 611. Various configurations are possible and contemplated without departing from the scope of the present disclosure.

In some examples, the number of the third symbol positions 612 may be fixed on every spin. FIG. 6B illustrates five third symbol positions 612, but other numbers (such as two, three, and so on) may be used without departing from the scope of the present disclosure. In other examples, the number may vary in a way that maintains an average over the series of spins (such as by selecting a number for a spin using an RNG and a weighted table that maintains the average number over the series of spins). Thus, "approximately constant" may be either fixed through the series of spins (unless the number of available positions due to held symbols decreases to less than the number of the third symbol positions 612 to be selected) or varying but averaging a number over the series of spins (unless the number of available positions due to held symbols decreases to less than the number of the third symbol positions 612 to be selected).

Figure 6C:
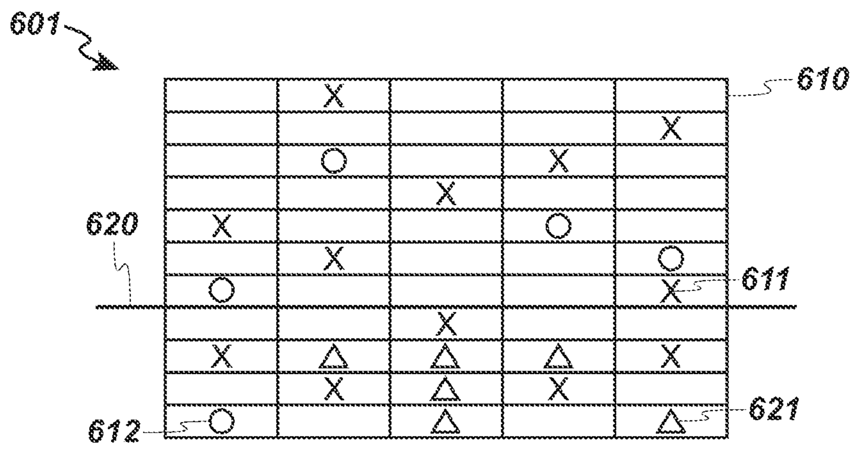
FIG. 6C depicts the example symbol matrix of FIG. 6A after a first spin.
Figure 6D:
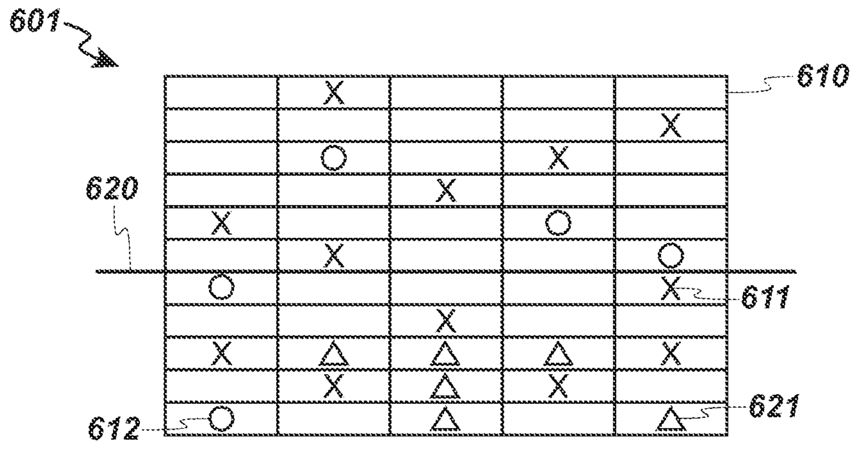
FIG. 6D depicts the example symbol matrix of FIG. 6C after one of the locked rows is unlocked.

As shown in FIGS. 6B-6D, the third symbol positions 612 may be anywhere in the example symbol matrix 601. However, it is understood that this is an example. However, in other implementations, positions of the third symbol positions 612 may be more restricted. For example in implementations where locked rows are hidden from a player's view, the third symbol positions 612 may be restricted to unlocked rows so that the player can always see any different triggering symbols that are selected. Various configurations are possible and contemplated without departing from the scope of the present disclosure.

Although FIG. 6B shows five second symbol positions 612, it is understood that this is an example. Other numbers may be used without departing from the scope of the present disclosure.

FIG. 6C depicts the example symbol matrix 601 of FIG. 6A after a first spin. The example symbol matrix 601 now includes fourth symbol positions 621 (shown with a triangle). These fourth symbol positions 621 are where a symbol has been held from a previous spin. Such fourth symbol positions 621 are not available for subsequent symbol selection. The hold-and-spin feature may end when all positions have held symbols in addition to the remaining spin count reaching zero. Various configurations are possible and contemplated without departing from the scope of the present disclosure.

FIG. 6D depicts the example symbol matrix 601 of FIG. 6C after one of the locked rows is unlocked. As shown, there are now five rows below the indicator 620 and six rows above whereas previously there were four rows below the indicator 620 and seven rows above. Credit symbols in the newly unlocked rows may now be used to determine the game outcome when the game outcome is determined. Various configurations are possible and contemplated without departing from the scope of the present disclosure.

FIG. 7 depicts examples of reel strip types 700 that may be used with one or more hold-and-spin features discussed herein. The examples of reel strip types include a regular reel strip type 701, a special or enhanced reel strip type 702, and a coin or other different triggering symbol reel strip type 703. The examples of reel strip types include one or more credit symbols 704, non-credit symbols 705, coin or other different triggering symbols 706, and so on. As shown, the regular reel strip type 701 may have a higher probability associated with non-credit symbols 705 (shown as 9) compared to credit symbols 704 (shown as 1) while the enhanced reel strip type 702 may have equal probabilities (shown as one) associated with both. As also shown, the different triggering symbol reel strip type 703 may include the probability of selecting different triggering symbols 706. Various configurations are possible and contemplated without departing from the scope of the present disclosure.

As shown, the different triggering symbol reel strip type 703 may be a modified version of the regular reel strip type 701 where one or more credit symbols 704 have been replaced with different triggering symbols 706. Similarly, the enhanced reel strip type 702 may be a modified version of the regular reel strip type 701 where probabilities associated with one or more credit symbols 704 have been increased (and/or probabilities associated with one or more non-credit symbols 705 have been decreased. Alternatively, the different triggering symbol reel strip type 703 may be a modified version of the enhanced reel strip type 702 instead of the regular reel strip type 701 and/or the enhanced reel strip type 702 may be a modified version of the different triggering symbol reel strip type 703 instead of the regular reel strip type 701. Various configurations are possible and contemplated without departing from the scope of the present disclosure.

As such, in some examples, only one reel type may be stored in memory and/or another non-transitory medium and other reel strip types may be generated for it when needed. This may improve the operation of an involved electronic device by reducing required memory and/or another non-transitory medium. Various configurations are possible and contemplated without departing from the scope of the present disclosure.

Alternatively and/or additionally, multiple reel strip types may be stored in memory and/or another non-transitory medium. This may improve the operation of an involved electronic device by reducing processor and/or other resources required to generate additional reel strip types when needed. Various configurations are possible and contemplated without departing from the scope of the present disclosure.

Although particular reel strip types are illustrated and described, it is understood that these are examples. In some examples, other reel strips may be used. By way of illustration, the reel strip types may include a jackpot reel strip type that includes one or more jackpot symbols and/or an increased probability of selecting one or more such jackpot symbols. Various configurations are possible and contemplated without departing from the scope of the present disclosure.

As discussed above, the present disclosure expands the hold-and-spin feature and increases the potential for the game outcome by triggering resetting of the remaining number of spins to different reset spin values based on the collection of a number of first respin triggering symbols. Having different numbers of reset spin values (and/or different numbers of added spins) may increase the randomness in the hold-and-spin feature. The increased randomness in the hold-and-spin feature may affect game volatility, RTP, and so on. In order to control and manage the degree of randomness in having different numbers of reset spin values (and/or different numbers of added spins), and thus controlling game volatility and/or thus maintaining a target RTP, multiple reel strip types with different properties may be used to select symbols for various positions in the symbol matrix. The multiple reel strip types may have different probabilities of selecting credit symbols, non-credit symbols, first respin triggering symbols, second respin triggering symbols, and so on. The degree of randomness in having different numbers of reset spin values (and/or different numbers of added spins) may thus be controlled by controlling which of the multiple reel strip types is used to select symbols for how many positions in the symbol matrix, which positions in the symbol matrix which of the multiple reel strip types is used to select symbols for, and so on.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. A system, comprising:

a non-transitory storage medium storing instructions; and a processor that executes the instructions to:

initiate a hold-and-spin feature involving a series of spins and a symbol matrix; and during the series of spins:

select symbols for the symbol matrix from multiple reel strip types, the multiple reel strip types including:

a first reel strip type including a first respin triggering symbol that is a credit symbol, wherein the first reel strip type including a first probability of selecting the credit symbol, and wherein the symbol matrix includes first reel strip type positions;

a second reel strip type including a second respin triggering symbol; and a third reel strip type that includes a second probability of selecting the credit symbol;

hold first symbols of the symbols that are the first respin triggering symbol between spins of the series of spins;

remove second symbols of the symbols that are the second respin triggering symbol after a spin of the series of spins;

randomly select second reel strip type positions in the symbol matrix for which the symbols are selected from the second reel strip type after the spin of the series of spins;

reset a number of spins remaining to a first reset spin value when the first symbols meet a first threshold; and reset the number of spins remaining to a second reset spin value when the first symbols meet a second threshold, wherein the symbol matrix includes unlocked rows and locked rows, wherein the processor unlocks at least one of the locked rows during the series of spins when a total number of credit symbols reaches an unlock threshold, and wherein the first probability, the second probability, and the first reel strip type positions in the symbol matrix are configured to control a rate at which the locked rows are unlocked during the series of spins.

2. The system of claim 1, wherein the symbols of the symbol matrix are selected from the first reel strip type and the first reel strip type positions remain unchanged between the spins of the series of spins.

3. The system of claim 1, wherein the first reel strip type, the second reel strip type, and the third reel strip type all include non-credit symbols and the second respin triggering symbol is one of the non-credit symbols.

4. The system of claim 1, wherein the symbols of the symbol matrix are selected from the first reel strip type and the first reel strip type positions are all on the unlocked rows.

5. The system of claim 1, wherein at least one of the multiple reel strip types is generated from another of the multiple reel strip types upon initiating the hold-and-spin feature.

6. The system of claim 1, wherein the processor selects a number of the second reel strip type positions after the spin of the series of spins.

7. A system, comprising:

a non-transitory storage medium storing instructions; and a processor that executes the instructions to:

initiate a hold-and-spin feature involving a series of spins and a symbol matrix; and during the series of spins:

select symbols for the symbol matrix from at least a first reel strip type and a second reel strip type, wherein the first reel strip type includes a first respin triggering symbol and a first probability of selecting a first respin triggering symbol, and wherein the second reel strip type includes a second respin triggering symbol and a second probability of selecting a second respin triggering symbol;

hold first symbols of the symbols that are the first respin triggering symbol between spins of the series of spins;

remove second symbols of the symbols that are the second respin triggering symbol after a spin of the series of spins;

reset a number of spins remaining to a first reset spin value when the first symbols meet a first threshold; and reset the number of spins remaining to a second reset spin value when the first symbols meet a second threshold;

control randomness during the series of spins by configuring a fixed number of first reel strip type positions in the symbol matrix from which the symbols may be selected from the first reel strip type unless the first reel strip type positions are occupied by one of the first symbols that are held, wherein the symbol matrix includes unlocked rows and locked rows, and wherein the processor unlocks at least one of the locked rows during the series of spins when a total number of credit symbols reaches an unlock threshold, and wherein the first probability, the second probability, and the first reel strip type positions in the symbol matrix are configured to control a rate at which the locked rows are unlocked during the series of spins.

8. The system of claim 7, wherein the symbol matrix includes second reel strip type positions where the symbols are selected from the second reel strip type and the second reel strip type positions change between the spins of the series of spins.

9. The system of claim 7, wherein the first reel strip type and the second reel strip type are retrieved from storage upon initiation of the hold-and-spin feature.

10. The system of claim 7, wherein at least one of:

the first respin spin value is higher than the second respin spin value; or the first threshold is less than the second threshold.

11. The system of claim 7, wherein the processor is further configured to execute instructions to: sum numeric credit values associated with the first symbols.

12. The system of claim 7, wherein the processor selects at least one of the symbols for the symbol matrix from a third reel strip type that includes at least one jackpot symbol.

13. A system, comprising:

a non-transitory storage medium storing instructions; and a processor that executes the instructions to:

initiate a hold-and-spin feature involving a series of spins and a symbol matrix that includes unlocked rows and locked rows; and during the series of spins:

select symbols for the symbol matrix from at least a first reel strip type and a second reel strip type, the first reel strip type including a first probability of selecting a credit symbol and the second reel strip type including a second probability of selecting the credit symbol;

hold credit symbols of the symbols between spins of the series of spins; and unlock at least one of the locked rows when a total number of the credit symbols reaches an unlock threshold; and control randomness during the series of spins by interspersing first reel strip type positions from which the symbols are selected from the first reel strip type across the locked rows; and sum credit symbols associated with the unlocked rows, wherein the first probability, the second probability, and the first reel strip type positions in the symbol matrix are configured to control a rate at which the locked rows are unlocked during the series of spins.

14. The system of claim 13, wherein at least one of the first reel strip type and the second reel strip type is generated from another of the first reel strip type and the second reel strip type upon initiating the hold-and-spin feature.

15. The system of claim 13, wherein the symbol matrix includes additional first reel strip type positions where the symbols are selected from the first reel strip type and the first reel strip type positions are interspersed across the unlocked rows.

16. The system of claim 13, wherein the unlocked rows are hidden from a player.

17. The system of claim 13, wherein the at least one of the locked rows that is unlocked when the total number of the credit symbols reaches the unlock threshold is adjacent to the unlocked rows.

18. The system of claim 13, wherein the processor presents an animation on a display of the system based on the summed credit symbols.

* * * * *